United States Patent
Dustin et al.

(10) Patent No.: US 10,400,136 B2
(45) Date of Patent: Sep. 3, 2019

(54) MULTIPHASE WATERBORNE COATINGS AND METHODS FOR FABRICATING THE SAME

(71) Applicant: HRL Laboratories, LLC, Malibu, CA (US)

(72) Inventors: Ashley M. Dustin, Los Angeles, CA (US); Andrew P. Nowak, Los Angeles, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/863,920

(22) Filed: Jan. 6, 2018

(65) Prior Publication Data

US 2018/0208795 A1 Jul. 26, 2018

Related U.S. Application Data

(60) Provisional application No. 62/450,066, filed on Jan. 24, 2017.

(51) Int. Cl.
| | | |
|---|---|---|
| *C09D 175/08* | (2006.01) | |
| *C08G 18/75* | (2006.01) | |
| *C08G 18/08* | (2006.01) | |
| *C08G 18/50* | (2006.01) | |
| *C08G 18/34* | (2006.01) | |
| *C08G 18/66* | (2006.01) | |
| *C09D 5/16* | (2006.01) | |
| *C08G 18/24* | (2006.01) | |
| *C09D 5/02* | (2006.01) | |

(52) U.S. Cl.
CPC ....... *C09D 175/08* (2013.01); *C08G 18/0823* (2013.01); *C08G 18/0871* (2013.01); *C08G 18/246* (2013.01); *C08G 18/348* (2013.01); *C08G 18/5015* (2013.01); *C08G 18/6692* (2013.01); *C08G 18/758* (2013.01); *C09D 5/022* (2013.01); *C09D 5/16* (2013.01); *C09D 5/1662* (2013.01)

(58) Field of Classification Search
CPC ............ C08G 18/0823; C08G 18/0871; C08G 18/246; C08G 18/348; C08G 18/5015; C08G 18/6692; C08G 18/758; C09D 5/022; C09D 5/16; C09D 5/1662; C09D 175/08
See application file for complete search history.

(56) References Cited

U.S. PATENT DOCUMENTS

| | | |
|---|---|---|
| 4,376,654 A | 3/1983 | Zola |
| 4,855,164 A | 8/1989 | Burkholder et al. |
| 5,672,653 A | 9/1997 | Frisch et al. |
| 6,005,031 A | 12/1999 | Bremer-Masseus et al. |
| 6,992,132 B2 | 1/2006 | Trombetta et al. |
| 2010/0063197 A1 | 3/2010 | Collier et al. |
| 2015/0247057 A1 | 9/2015 | Latham et al. |
| 2016/0194574 A1* | 7/2016 | Gross ............... C08G 81/00 508/138 |

OTHER PUBLICATIONS

Nicholson, Waterborne Coatings, Laboratory of the Government Chemist, Department of Trade and Industry, London, UK, A. D. Wilson et al. (eds.), Surface Coatings—2, Elsevier Applied Science Publishers Ltd, 1988.
Overbeek, "Polymer heterogeneity in waterborne coatings" J. Coat. Technol. Res., 7 (1) 1-21, 2010.
Cakić et al., "Thermal Analysis of Polyurethane Dispersions Based on Different Polyols", Published: Aug. 29, 2012.
International Preliminary Report on Patentability, PCT/US2018/012719, dated Feb. 11, 2019.

* cited by examiner

*Primary Examiner* — Edward J Cain
(74) *Attorney, Agent, or Firm* — O'Connor & Company

(57) ABSTRACT

This invention provides multifunctional coatings containing multiple components that usually do not associate with one another, from deposition of waterborne precursor compositions. Some variations provide a multiphase waterborne composition comprising a first-material phase containing a first material and a second-material phase containing a second material that is chemically different than, but covalently bonded to, the first material, wherein the first material and/or the second material contains ionic species. The first-material phase and the second-material phase are microphase-separated on an average length scale of phase inhomogeneity from about 0.1 microns to about 100 microns. The first and second materials may be selected from hydrophobic materials, hydrophilic materials, hygroscopic materials, oleophobic materials, and/or oleophilic materials, for example. Due to the first-material phase and the second-material phase being microphase-separated, the multiphase waterborne composition possesses a simultaneous combination of properties, rather than a combined average. Precursors and methods are also disclosed.

25 Claims, 7 Drawing Sheets

201

MULTIPHASE WATERBORNE COATINGS AND METHODS FOR FABRICATING THE SAME

PRIORITY DATA

This patent application is a non-provisional application claiming priority to U.S. Provisional Patent App. No. 62/450,066, filed on Jan. 24, 2017, which is hereby incorporated by reference herein.

FIELD OF THE INVENTION

The present invention generally relates to multiphase waterborne coatings, and precursors and methods for making multiphase waterborne coatings.

BACKGROUND OF THE INVENTION

Waterborne coatings are currently attracting much attention. Waterborne coatings, and specifically waterborne polyurethane dispersions (PUDs), are a highly investigated class of materials due to their low environmental impact. Waterborne polyurethane dispersions are desired as low-VOC (volatile organic compound) alternatives to traditional coating formulations.

One driving force for waterborne coating developments is the need to restrict the release of organic solvents into the atmosphere. Underlying the concern about solvent emissions are both economic and environmental considerations. Economically, waterborne coatings are favored. Not only is water the cheapest solvent available, but many solvents are derived from crude oil, which has a volatile price.

In the United States, there is legislation governing atmospheric release of organic solvents, particularly olefins, aromatics, and branched-chain ketones, which are photochemically active. Apart from the lack of environmentally damaging solvents, there are other attractions in the use of waterborne coatings. In particular, for personnel, there is less exposure to potentially harmful organic vapors, as well as less risk of fire. In addition, waste disposal from waterborne coatings is usually easier than disposal from solventborne formulations.

Broadly speaking, waterborne coatings fall between two extremes: completely water-soluble and completely water-insoluble. In the latter case, an emulsion consists of a dispersion of solid resin in water (also known as a latex). Practical coating systems generally fall between these two extremes. For example, some resins are soluble only in mixed solvent-water systems, while other coatings may be formulated from a mixture of water-soluble and water-dispersed resins. See Nicholson, *Waterborne Coatings*, Laboratory of the Government Chemist, Department of Trade and Industry, London, UK (1988), which is hereby incorporated by reference as background.

Waterborne anti-fouling coatings are of interest in a range of both automotive and aerospace applications, for example. Some applications include, but are not limited to, interior surfaces such as fabrics, carpeting, dashes, consoles, seats, tray tables, and touchscreens; and exterior surfaces such as body panels, windshields, windows, sensors, and cameras.

Various routes to aqueous-based coatings have been explored. Some unmet needs with current state of art include durability, scalability, and effectiveness over the lifetime of the coating. Commercial waterborne solutions often underperform when compared to solvent-based alternatives, especially with respect to durability. Many convention waterborne coatings are single-phase systems which limits the range of physical properties that can be expressed at the surface. Additives can be incorporated into the coating formulation to enhance a desired property.

There is a desire for water-based variants of solventborne coatings that combine multiple dissimilar elements at the surface. What are sought are multifunctional coatings containing multiple components that usually do not mix or associate with one another, produced from deposition of waterborne precursor compositions.

SUMMARY OF THE INVENTION

The present invention addresses the aforementioned needs in the art, as will now be summarized and then further described in detail below.

Some variations provide a multiphase waterborne composition comprising:

(a) a first-material phase containing a first material; and (b) a second-material phase containing a second material that is chemically different than the first material, wherein the first material and/or the second material contains ionic species, wherein the first material is covalently bonded to the second material, and wherein the first-material phase and the second-material phase are microphase-separated on an average length scale of phase inhomogeneity from about 0.1 microns to about 100 microns.

In some embodiments, the first-material phase is characterized by a first property, the second-material phase is characterized by a second property, and due to the first-material phase and the second-material phase being microphase-separated, the multiphase waterborne composition possesses a simultaneous combination of the first property and the second property.

In various embodiments, at least one of the first material or the second material is selected from the group consisting of a hydrophobic material, a hydrophilic material, a hygroscopic material, an oleophobic material, and an oleophilic material.

In some embodiments, one of the first material and the second material is a low-surface-energy polymer (e.g., a fluoropolymer) having a surface energy from about 5 mJ/m$^2$ to about 50 mJ/m$^2$.

The first material and the second material may be independently selected from the group consisting of fluoropolymers, polyesters, polyethers, polyolefins, polyacrylates, polymethacrylates, epoxies, polysiloxanes, polycarbonates, cellulosic polymers, polyelectrolytes, and combinations thereof.

In some embodiments, fluoropolymers are selected from the group consisting of perfluorocarbons, polyfluoroethers, perfluoropolyethers, polyfluoroacrylates, polyfluorosiloxanes, polyvinylfluoride, polyvinylidene fluoride, polytrifluoroethylene, polytetrafluoroethylene, polychlorotrifluoroethylene, fluoroacrylates, fluorosilicones, copolymers of ethylene and trifluoroethylene, copolymers of ethylene and chlorotrifluoroethylene, and combinations thereof.

In some embodiments, polyesters or polyethers are selected from the group consisting of poly(ethylene glycol), poly(acrylic acid), poly(vinyl pyrrolidone), poly(oxy methylene), poly(propylene oxide), poly(tetrahydrofuran), poly(vinyl imidazole), poly(2-methyl-2-oxazoline), poly(2-ethyl-2-oxazoline), poly(methyl methacrylate), poly(glycolic acid), poly(caprolactone), poly(ethylene adipate), polylactide, poly(hydroxyl butyrate), poly(hydroxyl alkanoate), poly(2-hydroxyethyl methacrylate), polydimethylsiloxane, methyl cellulose, carboxymethyl cellulose, hydroxyethyl cellulose, hydroxypropyl cellulose, cellulose hydrogels, monoacrylates or diacrylates of any of the foregoing, and combinations thereof.

In some embodiments, polyolefins are selected from the group consisting of polyethylene, polypropylene, polybutene, polybutadiene, hydrogenated polybutadiene, polymethylpentene, polyisobutylene, polyisoprene, and combinations thereof.

In some embodiments, one of the first material or the second material forms discrete inclusions in a continuous matrix comprising the other of the first material or the second material.

In certain embodiments, the first material and the second material are present as distinct soft segments of a segmented block copolymer, such as a urethane/urea segmented block copolymer.

The ionic species may be selected from the group consisting of an ionizable salt, an ionizable molecule, a zwitterionic component, a polyelectrolyte, an ionomer, and combinations, derivatives, or reaction products thereof. For example, the ionic species may be selected from the group consisting of (2,2-bis-(1-(1-methyl imidazolium)-methyl-propane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl) propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the first material contains a first reactive species and the second material contains a second reactive species, and the first reactive species and the second reactive species both participate in covalent bonds between the first material and the second material. For example, the first reactive species may be isocyanate, and the second reactive species may be a difunctional or multifunctional alcohol, a difunctional or multifunctional amine, or a combination thereof. The isocyanate may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof. As another example, the first reactive species may be epoxy, and the second reactive species may be a difunctional or multifunctional alcohol, a difunctional or multifunctional amine, a difunctional or multifunctional thiol, or a combination thereof.

Some or all of the ionic species may function also as the first reactive species and/or the second reactive species.

Some multiphase waterborne compositions further comprise one or more additional components selected from the group consisting of a particulate filler, a pigment, a dye, a plasticizer, a surfactant, a flame retardant, a biocide, and combinations thereof. The particulate filler may be selected from the group consisting of silica, alumina, silicates, talc, aluminosilicates, barium sulfate, mica, diatomite, calcium carbonate, calcium sulfate, carbon, wollastonite, and combinations thereof.

In some embodiments, the average length scale of phase inhomogeneity is from about 0.1 microns to about 10 microns. The multiphase waterborne composition may be homogeneous on a molecular length scale less than 0.1 microns. Alternatively, the multiphase waterborne composition may be inhomogeneous on a molecular length scale less than 0.1 microns.

The multiphase waterborne composition may be disposed in a coating on a substrate, such as a substrate selected from the group consisting of polymers, polymer composites, metals, ceramics, glass, paper, wood, leather, wool, and combinations thereof.

Other variations provide a waterborne precursor composition comprising:

(a) a liquid solvent comprising at least 50 wt % water;

(b) a first precursor material dissolved or suspended in the liquid solvent, wherein the first precursor material is a fluoropolymer; and (c) a second precursor material dissolved or suspended in the liquid solvent, wherein the second precursor material is different than the first precursor material, wherein the first precursor material and/or the second precursor material contains ionic species that provide aqueous dispersion stability to the waterborne precursor composition, wherein the first precursor material is covalently bonded to the second precursor material, and wherein the waterborne precursor composition is capable of hardening into a multiphase waterborne composition upon removal of the liquid solvent.

In some embodiments, the first precursor material and the second precursor material are at least partially phase-separated from each other within the waterborne precursor composition.

The fluoropolymer may be selected from the group consisting of perfluorocarbons, polyfluoroethers, perfluoropolyethers, polyfluoroacrylates, polyfluorosiloxanes, polyvinylfluoride, polyvinylidene fluoride, polytrifluoroethylene, polytetrafluoroethylene, polychlorotrifluoroethylene, fluoroacrylates, fluorosilicones, copolymers of ethylene and trifluoroethylene, copolymers of ethylene and chlorotrifluoroethylene, and combinations thereof.

The second precursor material may be selected from the group consisting of a hydrophobic material, a hydrophilic material, a hygroscopic material, an oleophobic material, and an oleophilic material.

In various embodiments, the second precursor material is selected from the group consisting of polyesters, polyethers, polyolefins, polyacrylates, polymethacrylates, epoxies, polysiloxanes, polycarbonates, cellulosic polymers, polyelectrolytes, and combinations thereof.

Polyesters or polyethers are selected from the group consisting of poly(ethylene glycol), poly(acrylic acid), poly(vinyl pyrrolidone), poly(oxy methylene), poly(propylene oxide), poly(tetrahydrofuran), poly(vinyl imidazole), poly(2-methyl-2-oxazoline), poly(2-ethyl-2-oxazoline), poly(methyl methacrylate), poly(glycolic acid), poly(caprolactone), poly(ethylene adipate), polylactide, poly(hydroxyl butyrate), poly(hydroxyl alkanoate), poly(2-hydroxyethyl methacrylate), polydimethylsiloxane, methyl cellulose, carboxymethyl cellulose, hydroxyethyl cellulose, hydroxypropyl cellulose, cellulose hydrogels, monoacrylates or diacrylates of any of the foregoing, and combinations thereof.

Polyolefins are selected from the group consisting of polyethylene, polypropylene, polybutene, polybutadiene, hydrogenated polybutadiene, polymethylpentene, polyisobutylene, polyisoprene, and combinations thereof.

The ionic species may be selected from the group consisting of an ionizable salt, an ionizable molecule, a zwitterionic component, a polyelectrolyte, an ionomer, and combinations, derivatives, or reaction products thereof. In certain embodiments, the ionic species is selected from the group consisting of (2,2-bis-(1-(1-methyl imidazolium)-methylpropane-1,3-diol bromide), 1,2-bis(2'-hydroxyethyl) imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the first precursor material contains a first reactive species and the second precursor material contains a second reactive species; the first reactive species and the second reactive species participate in covalent bonds between the first precursor material and the second precursor material. For example, the first reactive species may be isocyanate, and the second reactive species may be a difunctional or multifunctional alcohol, a difunctional or multifunctional amine, or a combination thereof. The isocyanate may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof. As another example, the first reactive species may be epoxy, and the second reactive species may be a difunctional or multifunctional alcohol, a difunctional or multifunctional amine, a difunctional or multifunctional thiol, or a combination thereof.

Some or all of the ionic species may function also as the first reactive species and/or the second reactive species.

The waterborne precursor composition may have a solids concentration from about 5 wt % to about 50 wt %, and a liquid solvent concentration from about 50 wt % to about 95 wt %, for example.

The waterborne precursor composition may be disposed in a coating precursor on a substrate, prior to or during formation of a multiphase waterborne composition.

Some variations of the invention provide a method of making a multiphase waterborne composition, the method comprising:

(i) obtaining a waterborne precursor composition comprising: (a) a liquid solvent comprising at least 50 wt % water; (b) a first precursor material dissolved or suspended in the liquid solvent, wherein the first precursor material is a fluoropolymer; and (c) a second precursor material dissolved or suspended in the liquid solvent, wherein the second precursor material is different than the first precursor material, wherein the first precursor material and/or the second precursor material contains ionic species that provide aqueous dispersion stability to the waterborne precursor composition, wherein the first precursor material is covalently bonded to the second precursor material; and (ii) removing the liquid solvent to harden the waterborne precursor composition into a multiphase waterborne composition.

In some embodiments, the waterborne precursor composition has a solids concentration from about 5 wt % to about 50 wt %, and a liquid solvent concentration from about 50 wt % to about 95 wt %.

In some embodiments, step (i) includes formation of a prepolymer of the first precursor material and the second precursor material. An organic solvent, in addition to water, may be utilized in the liquid solvent during the formation of prepolymer.

Additional covalent bonds may be formed between the first precursor material and the second precursor material during step (ii). For example, these additional covalent bonds may be formed after the waterborne precursor composition is applied to the surface of an object, such as during final curing.

The waterborne precursor composition may applied to an object or substrate prior to step (ii), during step (ii), and/or after step (ii). The object or substrate may be selected from the group consisting of polymers, polymer composites, metals, ceramics, glass, paper, wood, leather, wool, and combinations thereof.

The multiphase waterborne composition may contain a first-material phase and the second-material phase are microphase-separated on an average length scale of phase inhomogeneity from about 0.1 microns to about 100 microns.

DETAILED DESCRIPTION OF EMBODIMENTS OF THE INVENTION

Figure 1:
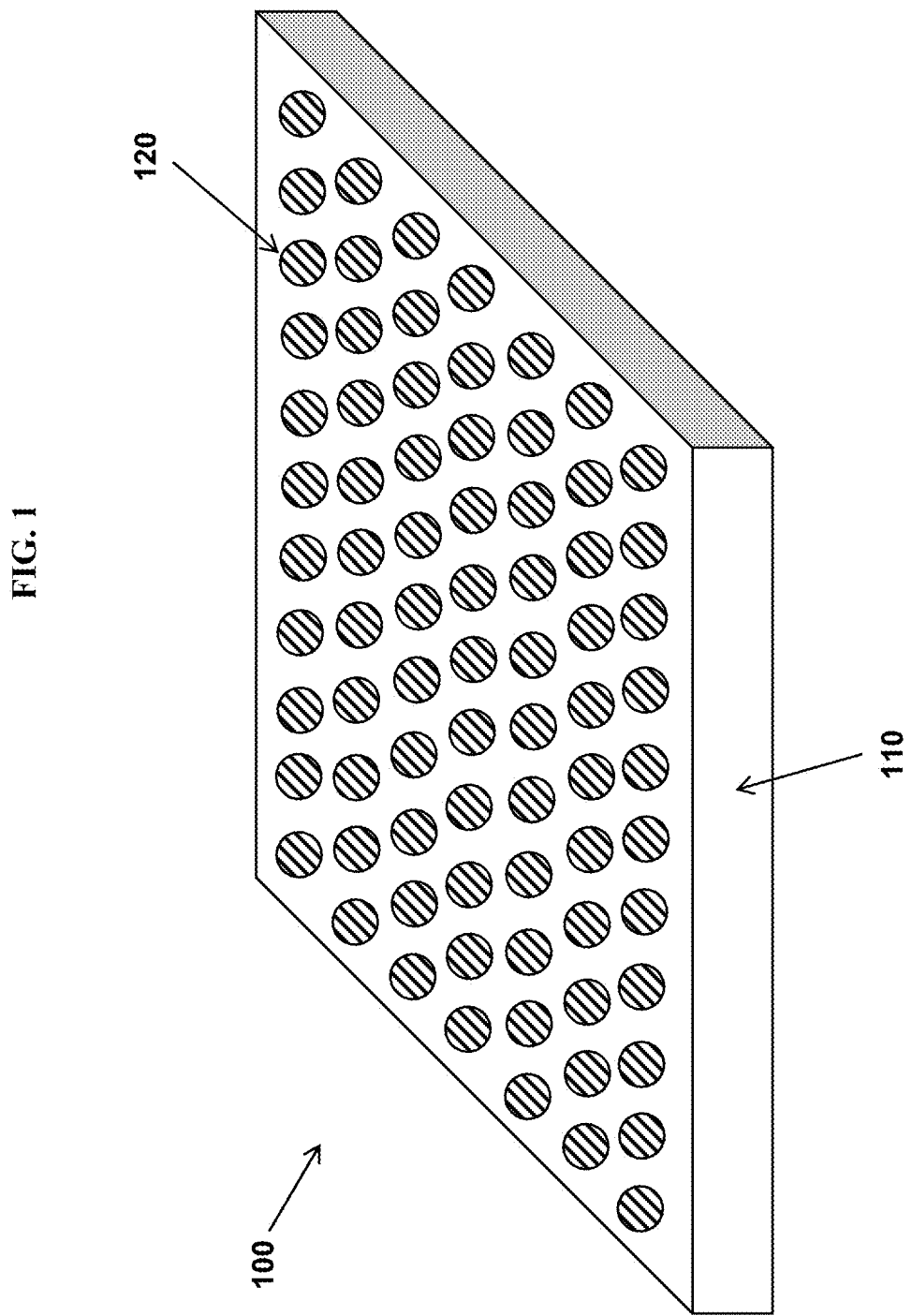
FIG. 1 depicts the structure of a multiphase coating or surface, in some embodiments.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of." Note that the Markush Group language "selected from the group consisting of" shall be properly construed in closed form for the group recited.

This patent application is premised on water-based methods to fabricate waterborne coatings (or other waterborne materials) containing two or more separate components that structure themselves at a solid substrate surface to create discrete domains or islands on the surface, resulting in the expression of two or more separate properties simultaneously, instead of a combined average for the coating. The multifunctional coatings utilize microphase separation with different waterborne materials that are covalently bonded to each other, as will be described in detail below. The combination of microphase-separated, dissimilar elements creates multifunctional waterborne coatings with properties not achievable in traditional single-phase coatings.

"Waterborne coatings" are defined as coatings which are formulated to contain a substantial amount of water in the volatiles that are removed during the coating deposition process. That is, water is employed as at least one of the solvents for dissolving or suspending coating precursors that are capable of forming a final coating. The liquid solvent contains at least 50 wt % water. The final coating may or may not contain residual water, depending on water removal efficiency and ambient humidity. The properties of a waterborne coating can depend on the nature of the solvent used to produce that coating. Properties include density, film uniformity/defects, minimum film formation temperature, durability and mechanical strength, coating clarity/opacity, gloss, water sensitivity, wettability, adhesion, penetrability (e.g., into substrate pores), etc.

Some applications of interest include, but are not limited to, anti-fouling coatings or surfaces, anti-ice coatings or surfaces, anti-bug coatings or surfaces, anti-oil coatings or surfaces, anti-smudge coatings or surfaces, and soil-repelling coatings or surfaces, for example. In particular, combining waterborne components in a manner that drives phase separation on the microscale (e.g., 0.1-10 μm) provides a route to high-performance coatings in the area of ice, bug, soil, and smudge repellency for both interior and exterior vehicle needs, among many other applications. Certain embodiments of this technology provide coatings that have a water-repelling and/or soil-repelling feature along with another chemical function that enables the coating to bind tightly to substrate surfaces of interest. Various aqueous-based components may be tailored based on desired end use; for example, one component may be optimized for surface adhesion while another component expresses a desired property such as oleophobicity. The individual waterborne components may be provided (e.g., commercial off-the-shelf products) or synthesized from precursors.

This invention enables the replacement of solventborne antithetical coatings (combining two or more dissimilar elements) with a waterborne technology. Increasing restrictions on volatile organic compounds (VOCs) require aqueous-based chemistry capable of meeting and/or exceeding current coating specifications. As a result, waterborne technology is more acceptable, from a regulatory standpoint and a health and safety perspective, over typical volatile-solvent-based chemistries. Waterborne chemistry provides scalable, green alternatives for current solvent-based coatings.

This invention is different than the combination of two reactive elements that are deposited on a surface and cured to a final blend that is homogeneous on length scales greater than 0.1 microns. In prior-art systems, inhomogeneity (if any) in cured systems is present at the molecular level (e.g., 10-100 nm). In the present invention, the coating is characterized by inhomogeneity of multiple elements (which may not normally mix or associate with one another) on a microphase-separation length scale of about 0.1 microns to about 10 microns. Microphase separation on this length scale is what allows the disclosed coatings to exhibit the properties of each individual component simultaneously.

The present invention addresses the current shortcomings of the art by maintaining commercial scalability for both the synthesis and application of the coating, such as via spray coating and self-organizing polymer domains. The disclosed methods provide durable, robust coatings that can withstand elements encountered on both interior and exterior vehicle surfaces through improved compatibility and adhesion, as a direct result of the multiphase structure. Also, the active elements of the coating are dispersed throughout the material to enable continued success over the lifetime of the coating.

Certain embodiments employ waterborne segmented copolymers. Waterborne segmented copolymers are typically created by combining (a) a flexible oligomeric soft segment terminated with alcohol or amine reactive groups and (b) a difunctional or multifunctional isocyanate. When the isocyanate is provided in excess to the alcohol/amine reactive groups, a viscous prepolymer mixture with a known chain length distribution is formed. The synthesis of aqueous dispersions preferably incorporates charged monomers or other ionic species into the prepolymer, such as a pendant carboxylic acid, to aid in the formation and stabilization of colloids during the dispersion in water. A waterborne polyurethane dispersion often requires some or all of the specific components to contain ionic groups to aid in stabilizing the emulsion (aqueous dispersion).

In some embodiments, the initial prepolymer reaction may be performed in the presence of a small amount of organic solvent to keep the viscosity of the reaction low enough prior to dispersion. Water is then added to the prepolymer at a specific rate and with intense mixing to form small protected particles. Finally, any remaining organic solvent may be removed. The prepolymer may then be cured to a high-molecular-weight network through the addition of amine or alcohol reactive groups, dispersed in water, to bring the ratio of isocyanate to amine or alcohol groups to unity.

The product of this reaction is a chain backbone with alternating soft segments composed of flexible oligomers and hard segments containing reaction products of low-molecular-weight isocyanates and alcohol/amines. Due to the chemical immiscibility of the soft and hard phases, the material will typically phase-separate on the molecular length scale of these individual blocks (e.g., 10-100 nanometers), creating a microstructure of flexible regions adjacent to rigid segments strongly associated through hydrogen bonding of the urethane/urea moieties. This combination of flexible and associated elements typically produces a physically crosslinked elastomeric material.

Incorporation of two or more soft segment oligomer blocks into a segmented polyurethane system results in more-complex microstructures that result in multiproperty compositions. The separate oligomer blocks will tend to microphase-separate from each other at a length scale that is larger than the molecular length scale of phase separation between the hard and soft segments—that is, more than 100 nanometers (such as about 0.1 microns to about 100 microns). Depending on the relative composition and concentration of the two soft segments, discrete or continuous phases may result. These morphologies allow for the combination of two or more desired properties. The multiple soft segments that are microphase-separated provide coating multifunctionality.

Some variations provide a multiphase waterborne composition comprising:

(a) a first-material phase containing a first material; and (b) a second-material phase containing a second material that is chemically different than the first material, wherein the first material and/or the second material contains ionic species, wherein the first material is covalently bonded to the second material, and wherein the first-material phase and the second-material phase are microphase-separated on an average length scale of phase inhomogeneity from about 0.1 microns to about 100 microns.

Unless otherwise indicated, all references to "phases" in this patent application are in reference to solid phases. The solid phases are typically polymeric and may melt or at least undergo a glass transition at elevated temperatures. Reference to multiple solid phases in a composition or microstructure means that there are at least two distinct chemical phases that are solid, without forming a solid solution or homogeneous mixture.

As intended in this patent application, "phase inhomogeneity," "inhomogeneous microstructure," and the like mean that a multiphase microstructure is present in which there are at least two discrete phases that are separated from each other. The two phases may be one discrete solid phase in a continuous solid phase, two co-continuous solid phases, or two discrete solid phases in a third continuous solid phase, for example. The phase inhomogeneity can be characterized by a length scale associated with a discrete phase. For example, the length scale of phase inhomogeneity may refer to the average size (e.g., effective diameter) of discrete inclusions of one phase dispersed in a continuous phase. The length scale of phase inhomogeneity may refer to the average center-to-center distance between nearest-neighbor inclusions of the same phase.

In some embodiments, the first-material phase is characterized by a first property, the second-material phase is characterized by a second property, and due to the first-material phase and the second-material phase being microphase-separated, the multiphase waterborne composition possesses a simultaneous combination of the first property and the second property.

In various embodiments, at least one of the first material or the second material is selected from the group consisting of a hydrophobic material, a hydrophilic material, a hygroscopic material, an oleophobic material, and an oleophilic material.

As intended in this patent application, "hygroscopic" means that the material is capable of attracting and holding water molecules from the surrounding environment. The water uptake of various polymers is described in Thijs et al., "Water uptake of hydrophilic polymers determined by a thermal gravimetric analyzer with a controlled humidity chamber", *J. Mater. Chem.* (17) 2007, 4864-4871, which is hereby incorporated by reference herein. In some embodiments, the hygroscopic material is selected from the group consisting of poly(acrylic acid), poly(ethylene glycol), poly (2-hydroxyethyl methacrylate), poly(vinyl imidazole), poly (2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In some embodiments, one of the first material and the second material is a low-surface-energy polymer having a surface energy from about 5 mJ/m$^2$ to about 50 mJ/m$^2$. As meant herein, a "low-surface-energy polymer" means a polymer, or a polymer-containing material, with a surface energy of no greater than 50 mJ/m$^2$. The principles of the invention may be applied to low-surface-energy materials with a surface energy of no greater than 50 mJ/m$^2$, in general (i.e., not necessarily limited to polymers). In some embodiments, the low-surface-energy polymer includes a fluoropolymer, such as (but not limited to) a fluoropolymer selected from the group consisting of polyfluoroethers, perfluoropolyethers, fluoroacrylates, fluorosilicones, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof. In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

The first material and/or the second material may be independently selected from the group consisting of fluoropolymers, polyesters, polyethers, polyolefins, polyacrylates, polymethacrylates, epoxies, polysiloxanes, polycarbonates, cellulosic polymers, polyelectrolytes, and combinations thereof.

In some embodiments employing fluoropolymers, the fluoropolymers are selected from the group consisting of perfluorocarbons, polyfluoroethers, perfluoropolyethers, polyfluoroacrylates, polyfluorosiloxanes, polyvinylfluoride, polyvinylidene fluoride, polytrifluoroethylene, polytetrafluoroethylene, polychlorotrifluoroethylene, fluoroacrylates, fluorosilicones, copolymers of ethylene and trifluoroethylene, copolymers of ethylene and chlorotrifluoroethylene, and combinations thereof.

In some embodiments employing polyesters or polyethers, the polyesters or polyethers are selected from the group consisting of poly(ethylene glycol), poly(acrylic acid), poly(vinyl pyrrolidone), poly(oxy methylene), poly(propylene oxide), poly(tetrahydrofuran), poly(vinyl imidazole), poly(2-methyl-2-oxazoline), poly(2-ethyl-2-oxazoline), poly(methyl methacrylate), poly(glycolic acid), poly(caprolactone), poly(ethylene adipate), polylactide, poly(hydroxyl butyrate), poly(hydroxyl alkanoate), poly(2-hydroxyethyl methacrylate), polydimethylsiloxane, methyl cellulose, carboxymethyl cellulose, hydroxyethyl cellulose, hydroxypropyl cellulose, cellulose hydrogels, monoacrylates or diacrylates of any of the foregoing, and combinations thereof.

In some embodiments employing polyolefins, the polyolefins are selected from the group consisting of polyethylene, polypropylene, polybutene, polybutadiene, hydrogenated polybutadiene, polymethylpentene, polyisobutylene, polyisoprene, and combinations thereof.

In some embodiments, one of the first material or the second material forms discrete inclusions in a continuous matrix comprising the other of the first material or the second material. In certain embodiments, one of discrete inclusions and a continuous matrix are derived from an aqueous dispersion of a linear crosslinkable polyurethane containing charged groups, and the other of discrete inclusions and the continuous matrix is derived from a crosslinking agent containing charged groups.

For example, the multiphase waterborne composition 100 of FIG. 1 includes a continuous matrix 110 as a first material. A "continuous matrix" (or equivalently, "substantially continuous matrix") means that the matrix material is present in a form that includes chemical bonds among molecules of the matrix material. An example of such chemical bonds is crosslinking bonds between polymer chains. In a substantially continuous matrix 110, there may be present various defects, cracks, broken bonds, impurities, additives, and so on. The multiphase waterborne composition 100 further includes a plurality of inclusions 120 (depicted as two-dimensional circles for illustration purposes only) as a second material, intimately dispersed within the matrix 110. The inclusions 120 are three-dimensional objects or domains, which may be of any shape, geometry, or aspect ratio. In certain embodiments, the inclusions 120 are covalently bonded with the matrix 110 in a copolymer. Note that in FIG. 1, the functions of the continuous matrix 110 and discrete inclusions 120 may be reversed. Water may or may not be present in the multiphase waterborne composition 100.

In certain embodiments, with reference to FIG. 1, the first material 110 and the second material 120 are present as distinct soft segments of a segmented block copolymer, such as a urethane/urea segmented block copolymer. These embodiments may also be understood with reference to FIG. 4 (discussed below), in which the first material 410 and second material 420 are present as distinct soft segments of a segmented block copolymer. Potential soft segments include, but are not limited to, fluorinated polymers, polyesters, polyethers, polyolefins, polyacrylates, polymethacrylates, epoxies, polysiloxanes, polycarbonates, cellulosic polymers, or combinations thereof. These soft segments may be hydroxyl-terminated and/or amine-terminated, for example.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers. Segmented block copolymers are preferred, in some embodiments of the invention.

In some embodiments, a block copolymer may be a segmented copolymer composition comprising:

(a) one or more first soft segments selected from fluoropolymers having an average molecular weight from about 500 g/mol to about 10,000 g/mol, wherein the fluoropolymers are $(\alpha,\omega)$-hydroxyl-terminated and/or $(\alpha,\omega)$-amine-terminated;

(b) one or more second soft segments selected from polyesters, polyethers, or polyolefins, wherein the polyesters, polyethers, or polyolefins are $(\alpha,\omega)$-hydroxyl-terminated and/or $(\alpha,\omega)$-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein at least one of (i) the fluoropolymers and (ii) the polyesters, polyethers, or polyolefins contain the ionic species.

It is noted that $(\alpha,\omega)$-terminated polymers are terminated at each end of the polymer. The $\alpha$-termination may be the same or different than the $\omega$-termination. Also it is noted that in this disclosure, "$(\alpha,\omega)$-termination" includes branching at the ends, so that the number of terminations may be greater than 2 per polymer molecule. The polymers herein may be linear or branched, and there may be various terminations and functional groups within the polymer chain, besides the end $(\alpha,\omega)$ terminations.

In some embodiments, the molar ratio of the second soft segments to the first soft segments is from about 0.1 to about 1.5. In various embodiments, the molar ratio of the second soft segments to the first soft segments is about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In specific embodiments, the fluoropolymers include a fluoropolymer having the structure:

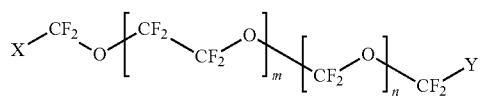

wherein:

X, Y=CH$_2$—(O—CH$_2$—CH$_2$)$_p$—OH or CH$_2$—(O—CH$_2$—CH$_2$)$_p$—NH$_2$ wherein p=0 to 50 and wherein X and Y are independently selected (i.e., X and Y may be the same or different);

m=1 to 100; and n=1 to 100.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 2.5, 3.0, or greater), i.e. beyond diols or diamines.

At least one polyol or polyamine chain extender or crosslinker may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof. In some embodiments, polymeric forms of polyol chain extenders or crosslinkers are utilized, typically hydrocarbon or acrylic backbones with hydroxyl groups distributed along the sidegroups. These crosslinkers typically possess a functionality of much greater than 2.

The one or more chain extenders or crosslinkers (or reaction products thereof) may be present in a concentration, in the segmented copolymer composition, from about 0.01 wt % to about 25 wt %, such as about 0.05 wt % to about 10 wt %.

The ionic species in the multiphase waterborne composition (i.e., in the first material and/or the second material) may be selected from the group consisting of an ionizable salt, an ionizable molecule, a zwitterionic component, a polyelectrolyte, an ionomer, and combinations, derivatives, or reaction products thereof. For example, the ionic species may be selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3λ$^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, salts, or reaction products thereof.

In some embodiments, the first material contains a first reactive species and the second material contains a second reactive species, and the first reactive species and the second reactive species both participate in covalent bonds between the first material and the second material. In some embodiments, covalent bonding arises from reactive groups capable of participating in a polyurethane structure (e.g., alcohols, amines, and/or isocyanates).

For example, the first reactive species may be isocyanate, and the second reactive species may be a difunctional or multifunctional alcohol, a difunctional or multifunctional amine, or a combination thereof. "Difunctional" means there are two functional groups (e.g., OH groups and/or NH$_2$ groups) per molecule, while "multifunctional" means there are three or more functional groups per molecule. The isocyanate may be selected, for example, from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

As another example, the first reactive species may be epoxy, and the second reactive species may be a difunctional or multifunctional alcohol, a difunctional or multifunctional amine, a difunctional or multifunctional thiol, or a combination thereof.

Some or all of the ionic species may function also as the first reactive species and/or the second reactive species. In these embodiments, the ionic groups that aid in stabilizing the waterborne emulsion during synthesis, are simultaneously or sequentially used as reactive species between the first material and the second material. In these embodiments, the ionic groups may participate in ionic bonds, covalent bonds, or both of these.

In some embodiments, the average length scale of phase inhomogeneity is from about 0.1 microns to about 10 microns. In various embodiments, the average length scale of phase inhomogeneity is about, at least about, or at most about 0.15, 0.2, 0.5, 1, 1.5, 2, 5, 10, 20, 30, 40, 50, 60, 70, 80, 90, or 100 microns, including any intervening range of average length scales of phase inhomogeneity. The length scale of phase inhomogeneity may be characterized by a narrow length-scale distribution (low variance), which may result from tight control of emulsion phase inversion, for example.

The multiphase waterborne composition may be homogeneous on a molecular length scale less than 0.1 microns. Alternatively, the multiphase waterborne composition may be inhomogeneous on a molecular length scale less than 0.1 microns, hierarchically distinct from the average length scales of phase inhomogeneity (0.1-100 microns) cited above.

Figure 4:
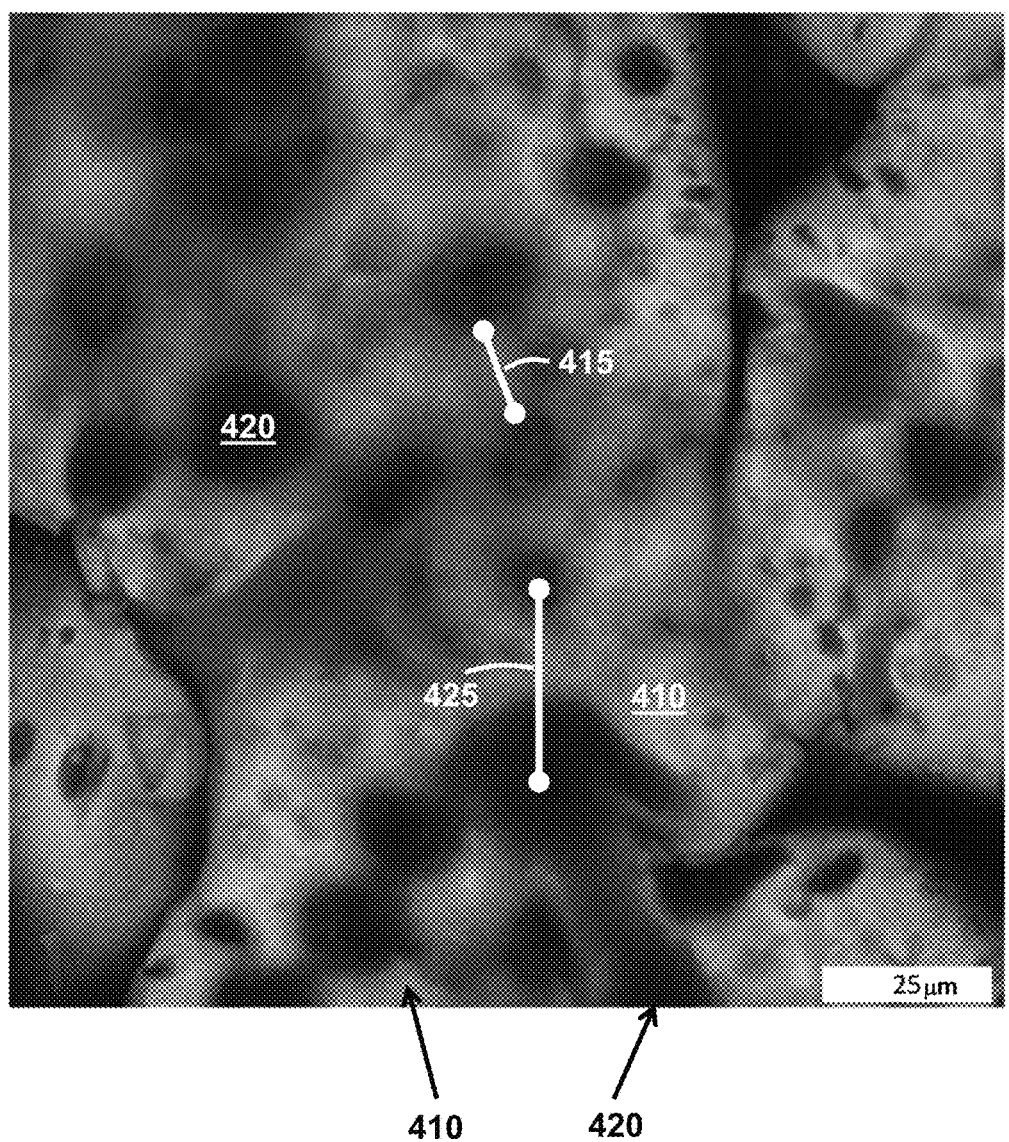
FIG. 4 is an illustration of an exemplary multiphase waterborne composition microstructure with phase inhomogeneity, in which a first material (lighter regions of the image) and inclusions of a second material (darker regions of the image) are microphase-separated.

Phase inhomogeneity is shown for illustration purposes in FIG. 4, which has a scale bar of 25 μm. The microstructure of FIG. 4 includes a first material 410 (lighter regions of the image) and inclusions of a second material 420 (darker regions of the image). The first material 410 and second material 420 are different and may be, for example, selected from hydrophobic materials, hydrophilic materials, hygroscopic materials, oleophobic materials, oleophilic materials, or combinations thereof. Microphase separation is shown in FIG. 4. The length scale of phase inhomogeneity for the structure in FIG. 4 is in the range of 1 to 100 microns. In particular, the phase inhomogeneity can be characterized by a length scale associated with a discrete phase 420. For example, the length scale of phase inhomogeneity may refer to the average size (e.g., effective diameter) of discrete inclusions of one phase 420 dispersed in a continuous phase 410. The selected (for illustration) inclusions 420 have an effective diameter of about 15-20 microns; generally the inclusions have an effective diameter of about 1 to 100 microns in FIG. 4. The length scale of phase inhomogeneity may refer to the average center-to-center distance 425 between nearest-neighbor inclusions of the same phase 420. In FIG. 4, the selected center-to-center distance 425 is about 30 microns. The length scale of phase inhomogeneity may alternatively refer to the average separation distance 415 between nearest-neighbor regions of the discrete (e.g., derived from waterborne emulsion droplets) phase 420, i.e. the size of the continuous phase 410 regions. In FIG. 4, the selected separation distance 415 is about 15 microns. A range of particle sizes and separations is clearly present in this structure; the specific instances of features 410, 415, 420, and 425 are arbitrarily selected.

Some variations utilize a material that possesses both low surface energy (for low adhesion) and the ability to absorb water. A structured material or coating may passively absorb water from the atmosphere and then expel this water to create a lubrication/self-cleaning layer. Because these materials trap a layer of water near the surface, they can delay the formation of ice. The coating in some embodiments may thus be characterized as "icephobic," which is intended to mean the coating is capable of delaying the formation of ice and/or causing a freezing-point depression of ice, compared to a bare substrate. The lubricating component has the ability to trap and organize a layer of water at the surface to both inhibit freezing and reduce adhesion forces in ice that does begin to accumulate on the surface. In some variations, low-ice-adhesion structures are created by an inhomogeneous microstructure comprising a low-surface-energy polymer that is interspersed with hygroscopic domains (lubricating inclusions).

In some embodiments, the phase inhomogeneity causes opaque coatings due to the scattering of light. Scattering of light including visible wavelengths in the bulk of a material is governed by changes in the index of refraction through the medium. Variations in refractive index at length scales near the wavelength of the propagating radiation will tend to scatter those wavelengths more effectively (Mie scattering), resulting in an opaque or white appearance for a coating. With visible light having a wavelength range of about 400-700 nm, a clear or transparent coating must typically keep variations in index of refraction below about 50 nm in length. As phase inhomogeneities increase in length scale, the opacity of the material rises. Phase inhomogeneities with average length scale from 0.1 μm to 500 μm are expected to drive significant scattering in the material, leading to opaque structures above 25 μm in thickness—unless the multiple phases happen to be refractive index-matched. See Althues et al., "Functional inorganic nanofillers for transparent polymers", *Chem. Soc. Rev.*, 2007, 36, 1454-1465, which is hereby incorporated by reference herein for its teaching that materials with inhomogeneity below 50 nm will tend to be clear, and materials with inhomogeneity above 50 nm (0.05 μm) will tend to be more opaque.

Some multiphase waterborne compositions further comprise one or more additional components selected from the group consisting of a particulate filler, a pigment, a dye, a plasticizer, a surfactant, a flame retardant, a biocide, and combinations thereof. The particulate filler may be selected from the group consisting of silica, alumina, silicates, talc, aluminosilicates, barium sulfate, mica, diatomite, calcium carbonate, calcium sulfate, carbon, wollastonite, and combinations thereof.

A wide range of concentrations of components may be present in the multiphase waterborne composition. For example, the first material may be from about 1 wt % to about 99 wt %, such as from about 10 wt % to about 50 wt % of the multiphase waterborne composition. The second material may be from about 1 wt % to about 99 wt %, such as from about 10 wt % to about 50 wt % of the multiphase waterborne composition. Other components may be present.

In some embodiments, the multiphase waterborne composition further comprises a third material contained in the first-material phase, the second-material phase, a third-material phase, or a combination thereof.

In various embodiments, the multiphase waterborne composition is a coating and/or is present at a surface of an object or region. The multiphase waterborne composition may be utilized in relatively small applications, such as lens coatings, or for large structures, such as aircraft wings. In principle, the multiphase waterborne composition could be present within a bulk region of an object or part. In certain embodiments, the multiphase waterborne composition provided herein is disposed with a temporary, protective laminating film for storage or transport, which film is later removed.

The multiphase waterborne composition may be disposed in a coating on a substrate, such as a substrate selected from the group consisting of polymers, polymer composites, metals, ceramics, glass, paper, wood, leather, wool, and combinations thereof. Other substrates may be employed.

The micron-scale inhomogeneity exists throughout the multiphase waterborne composition, in both planar and depth dimensions. That it, the properties are not just a surface effect and will be present even if the multiphase waterborne coating is eroded over time. The multiple functions of the coating are retained even after abrasion (for whatever reason) of the top layer of the material.

The multiphase waterborne compositions disclosed herein may be applied to aerospace-relevant surfaces. As intended herein, an "aerospace-relevant surface" is any surface, substrate, or region of material which may be exposed to ice or water that has the potential to freeze, and which is contained on or in an aerospace structure. Examples of aerospace-relevant surfaces include, but are not limited to, surfaces of airfoils, aircraft wings, rotor blades, propeller blades, engine-intake regions, nose cones, fan blades, windows, or antennas. Aerospace-relevant surfaces may be any portions of these surfaces, or surfaces which overlap, or contain other surfaces. In some embodiments, the aerospace-relevant surface is an airfoil surface, which is typically not a flat surface. In certain embodiments, the airfoil surface is a curved surface of a rotorcraft airfoil. In certain embodiments, the coatings may be applied onto aircraft exteriors, in order to passively suppress the growth of ice near strategic points on the vehicle (e.g., rotorblade edge, wing leading edge, or engine inlet).

The coatings disclosed herein may be applied to other structures including, but not limited to, wind turbine blades, automobiles, trucks, trains, ocean-going vessels, electrical power transmission lines, buildings, antennas, chemical plant infrastructure (e.g., distillation columns and heat exchangers), and so on. Other practical applications for the present invention include, but are not limited to, vehicle windows, filters, instruments, sensors, cameras, satellites, and weapon systems. For example, automotive applications can utilize these coatings to prevent the formation of ice on back-up sensors.

Some variations provide a waterborne precursor composition comprising:

(a) a liquid solvent comprising at least 50 wt % water;

(b) a first precursor material dissolved or suspended in the liquid solvent, wherein the first precursor material is a fluoropolymer; and (c) a second precursor material dissolved or suspended in the liquid solvent, wherein the second precursor material is different than the first precursor material, wherein the first precursor material and/or the second precursor material contains ionic species that provide aqueous dispersion stability to the waterborne precursor composition, wherein the first precursor material is covalently bonded to the second precursor material, and wherein the waterborne precursor composition is capable of hardening into a multiphase waterborne composition upon removal of the liquid solvent.

In some embodiments, the first precursor material and the second precursor material are at least partially phase-separated from each other within the waterborne precursor composition.

In general, waterborne precursor compositions may include precursor materials that are obtained from commercial sources or fabricated from starting components.

The fluoropolymer may be selected from the group consisting of perfluorocarbons, polyfluoroethers, perfluoropolyethers, polyfluoroacrylates, polyfluorosiloxanes, polyvinylfluoride, polyvinylidene fluoride, polytrifluoroethylene, polytetrafluoroethylene, polychlorotrifluoroethylene, fluoroacrylates, fluorosilicones, copolymers of ethylene and trifluoroethylene, copolymers of ethylene and chlorotrifluoroethylene, and combinations thereof.

The second precursor material may be selected from the group consisting of a hydrophobic material, a hydrophilic material, a hygroscopic material, an oleophobic material, and an oleophilic material.

In various embodiments, the second precursor material is selected from the group consisting of polyesters, polyethers, polyolefins, polyacrylates, polymethacrylates, epoxies, polysiloxanes, polycarbonates, cellulosic polymers, polyelectrolytes, and combinations thereof.

Polyesters or polyethers are selected from the group consisting of poly(ethylene glycol), poly(acrylic acid), poly(vinyl pyrrolidone), poly(oxy methylene), poly(propylene oxide), poly(tetrahydrofuran), poly(vinyl imidazole), poly(2-methyl-2-oxazoline), poly(2-ethyl-2-oxazoline), poly(methyl methacrylate), poly(glycolic acid), poly(caprolactone), poly(ethylene adipate), polylactide, poly(hydroxyl butyrate), poly(hydroxyl alkanoate), poly(2-hydroxyethyl methacrylate), polydimethylsiloxane, methyl cellulose, carboxymethyl cellulose, hydroxyethyl cellulose, hydroxypropyl cellulose, cellulose hydrogels, monoacrylates or diacrylates of any of the foregoing, and combinations thereof.

Polyolefins are selected from the group consisting of polyethylene, polypropylene, polybutene, polybutadiene, hydrogenated polybutadiene, polymethylpentene, polyisobutylene, polyisoprene, and combinations thereof.

The ionic species may be selected from the group consisting of an ionizable salt, an ionizable molecule, a zwitterionic component, a polyelectrolyte, an ionomer, and combinations, derivatives, or reaction products thereof. In certain embodiments, the ionic species is selected from the group consisting of (2,2-bis-(1-(1-methyl imidazolium)-methylpropane-1,3-diol bromide), 1,2-bis(2'-hydroxyethyl) imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the first precursor material and second precursor material usually do not mix or associate with one another in an aqueous system, but when one or both of these are modified with ionic species, mixing and association become possible within the waterborne precursor composition.

In some embodiments, the first precursor material contains a first reactive species and the second precursor material contains a second reactive species, and the first reactive species and the second reactive species participate in covalent bonds between the first precursor material and the second precursor material. For example, the first reactive species may be isocyanate, and the second reactive species may be a difunctional or multifunctional alcohol, a difunctional or multifunctional amine, or a combination thereof. The isocyanate may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof. As another example, the first reactive species may be epoxy, and the second reactive species may be a difunctional or multifunctional alcohol, a difunctional or multifunctional amine, a difunctional or multifunctional thiol, or a combination thereof.

Some or all of the ionic species may function also as the first reactive species and/or the second reactive species.

The waterborne precursor composition may have a solids concentration from about 5 wt % to about 50 wt %, and a liquid solvent concentration from about 50 wt % to about 95 wt %, for example. In other embodiments, the waterborne precursor composition has a solids concentration from about 0.1 wt % to about 20 wt %, and a liquid solvent concentration from about 80 wt % to about 99.9 wt %. During removal of liquid solvent, the solids concentration of the waterborne precursor composition increases until formation of the hardened coating that contains little or no residual liquid solvent.

The first precursor material and the second precursor material are dissolved and/or suspended in the liquid solvent. That is, the waterborne precursor composition may be a true solution, an insoluble suspension, or anything in between these extremes.

In some embodiments, the waterborne precursor composition is an emulsion in which the liquid solvent forms a continuous phase and the first precursor material and the second precursor material form a dispersed phase, or distinct dispersed phases, or both of these (including at different points in time).

In some embodiments, the waterborne precursor composition is an emulsion in which the liquid solvent and one of the first precursor material or the second precursor material form a continuous phase, and the other of the first precursor material or the second precursor material forms a dispersed phase.

During synthesis of the waterborne precursor composition as well as during the coating deposition process, the nature of the phases and phase interactions typically varies. For example, a waterborne precursor composition may begin with a continuous phase and two dispersed phases containing the two precursor materials. When the solvent is driven off and/or under conditions that cause chemical reactions (e.g., changes in temperature, pressure, pH, mixing, etc.), the two precursor materials may react with each other, such as to form covalent bonds or to crosslink. Following such chemical reaction, there may be one distinct dispersed phase in the continuous phase (the remaining liquid solvent). The distinct dispersed phase may actually contain multiple phases of material but in close association, forming for example single droplets in the continuous phase. Solidification or hardening (with removal of liquid solvent) can then result in a final coating in which there is a first-material phase and a second-material phase that are microphase-separated, such as on an average length scale of phase inhomogeneity from about 0.1 microns to about 100 microns (e.g., see FIG. 4).

The liquid solvent, in addition to water, may contain various other solvents. The use of a solvent other than water may be desirable to reduce the prepolymer viscosity, provide a heat sink, serve as refluxing medium, and/or assist with film formation.

In various embodiments, the liquid solvent is at least 50, 60, 70, 80, 85, 90, 95, or 99 wt % water. The composition of the liquid solvent may vary over time during synthesis, e.g. due to water addition or water removal. When the solvent composition varies over time (during synthesis of the multiphase waterborne composition), the liquid solvent may be at least 50, 60, 70, 80, 85, 90, 95, or 99 wt % water, on a time-weighted-average basis.

Solvents with a higher boiling point than water generally remain with the aqueous dispersion and facilitate the coalescence of the solid particles during drying and film formation. In some cases, it is desirable to remove at least a portion of a solvent from the dispersion. This can be done with solvents which have a lower boiling point than water. These solvents may be removed from the dispersion by, for example, distillation, vacuum distillation, isotropic distillation, or thin-film evaporation.

Solvents other than water may be selected from polar organic solvents, polar inorganic solvents, polar protic solvents, polar aprotic solvents, or ionic liquids, for example. Preferably, other solvents, when employed, are miscible in water so as to provide a single continuous liquid phase. It is possible, in certain embodiments, to utilize two continuous phases by incorporating a solvent that is not completely miscible in water.

Examples of polar aprotic (and organic) solvents include acetone, methyl ethyl ketone, and methyl isobutyl ketone. Acetone can be preferred because it is known as a VOC-exempt solvent under U.S. law (40 CFR § 51.100). Preferably, the solvent is not an alcohol or other species reactive with the two precursor materials present in the waterborne precursor composition.

A compound other than water can be incorporated in the liquid solvent to reduce the surface tension between the liquid and the solid present. Optionally, surfactants are added to the liquid solvent to reduce surface tension.

The choice of liquid solvent composition is dictated, at least in part, by the composition of the two precursor materials in the waterborne precursor composition. For example, when highly polar monomers are included in order to confer either water solubility or water dispersibility, the liquid solvent may consist essentially of water. When the waterborne precursor composition is not completely water-soluble, but is water-dispersible, it may be beneficial to include at least one component other than water in the liquid solvent, depending on the nature of the two precursor materials.

As noted earlier, in some embodiments, an initial prepolymer reaction may be performed in the presence of some organic solvent (in addition to water) to keep the viscosity of the reaction low enough prior to dispersion. Later, more water may be added, organic solvent removed (such as by vacuum extraction), or both of these.

A waterborne precursor composition typically requires the first precursor material and/or the second precursor material to contain ionic groups to aid in stabilizing the aqueous emulsion. Other factors contributing to the formulation of a stable dispersion include the concentration of ionic groups, concentration of water or solvent, and rate of water addition, and mixing during the inversion process.

Dispersibility of the two precursor materials in the liquid solvent may be enhanced by intense mixing, continuous circulation, or other mass-transport effects, in order to stabilize an emulsion. Alternatively, or additionally, dispersibility of the two precursor materials in the liquid solvent may be enhanced by thermal means (e.g., elevated temperature).

In some embodiments, a prepolymer is first made from the two precursor materials and then dispersed in water, forming a waterborne precursor composition that contains some covalent bonds. During the coating process with removal of liquid solvent, more covalent bonds are formed between the two precursor materials as the prepolymer coalesces into a polymer.

In some embodiments, the waterborne precursor composition is a polyurethane dispersion or multiple polyurethane dispersions. Two or more polyurethane dispersions may be combined and applied to a substrate surface in the presence of one or more curatives and optional additives, followed by curing, to produce a multiphase waterborne coating. In certain embodiments, one polyurethane component is a fluorinated material. A preferred example of a fluorinated soft segment is based on the perfluoropolyether structure. Oil-absorbing polyurethane elements may be made from polyolefin species, such as polybutadiene.

Some waterborne precursor compositions employ waterborne polyurethane dispersions combining oleophobic and oleophilic species. An oleophobic or oleophilic isocyanate prepolymer may be dispersed in water (optionally with another liquid component). Subsequently, a curative component expressing another desired property (e.g., oleophilic or oleophobic) may be dispersed in water. After coating onto a substrate and evaporating the water, a microphase-separated polyurethane film containing multiple components with distinct properties is formed.

In a waterborne polyurethane dispersion, it is also possible to add a curing agent (chain extender or crosslinker) during the dispersion step. In some embodiments, a polyurea coating forms on the particles and inhibits curing until the coating is deposited and allowed to cure (harden).

When it is desired to form a coating, the waterborne precursor composition may be disposed in a coating precursor on a substrate, prior to, during, or following formation of a multiphase waterborne composition. Specific coating surfaces include, but are not limited to, fabrics such as polyester, nylon, wool, and leather, as well as glass and polyvinyl chloride. Coating surfaces may be in or outside a vehicle, on furniture and other household objects, on consumer goods such as computers or phone screens, and so on.

In some embodiments, materials or coatings may utilize simultaneous deposition of components or precursor materials to reduce fabrication cost and time. In particular, these materials or coatings may be formed by a one-step process, in some embodiments. In other embodiments, these materials or coatings may be formed by a multiple-step process.

The multiphase waterborne composition, in some embodiments, is formed from a precursor material (or combination of materials) that may be provided, obtained, or fabricated from starting components. The precursor material is capable of hardening or curing in some fashion, to form a multiphase waterborne composition. The waterborne precursor material may be a liquid; a multiphase liquid; a multiphase slurry, emulsion, or suspension; a gel; or a dissolved solid, for example.

The first and second materials may be in the same phase or in different phases, within the precursor material. In some embodiments, the first material is in liquid or dissolved form while the second material is in dissolved-solid or suspended solid form. In some embodiments, the first material is in dissolved-solid or suspended-solid form while the second material is in liquid or dissolved form. In some embodiments, the first and second materials are both in dissolved (in liquid solvent) form.

In some embodiments of the invention, an emulsion sets up in the reaction mixture based on incompatibility between the two blocks (e.g., PEG and PFPE). The emulsion provides microphase separation in the precursor material. The precursor material is then cured after casting or spraying, for example. The microphase separation survives the curing process (even if the length scales change during curing), providing the multiproperty benefits in the final materials as described herein. Without being limited by theory, the microphase separation in this invention is not associated with molecular length-scale separation (5-50 nm) that many classic block-copolymer systems exhibit. Rather, the larger length scales of microphase separation, i.e. 0.1-100 µm, arise from the emulsion that was set-up prior to curing. Note that these methods are different than patterning phase inhomogeneity with microscale lithography.

Xu et al., "Structure and morphology of segmented polyurethanes: 1. Influence of incompatibility on hard-segment sequence length," POLYMER 1983, Vol. 24, pages 1327-1332 and Chen et al., Structure and morphology of segmented polyurethanes: 2. Influence of reactant incompatibility," POLYMER 1983, Vol. 24, pages 1333-1340, are each hereby incorporated by reference herein for their teachings about emulsion set-up in polyurethane systems prior to curing.

In some variations of the invention, a material or coating precursor is applied to a substrate (such as a surface of an automobile or aircraft) and allowed to react, cure, or harden to form a final multiphase waterborne composition that includes:

(a) a first-material phase containing a first material; and (b) a second-material phase containing a second material that is chemically different than the first material, wherein the first material and/or the second material contains ionic species, wherein the first material is covalently bonded to the second material, and wherein the first-material phase and the second-material phase are microphase-separated on an average length scale of phase inhomogeneity from about 0.1 microns to about 100 microns.

In some embodiments, a waterborne precursor material is prepared and then dispensed (deposited) over an area of interest. Any known methods to deposit precursor materials may be employed. A fluid precursor material (i.e., with at least some of the liquid solvent still present) allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. The fluid precursor material may be rapidly sprayed or cast in thin layers over large areas (such as multiple square meters).

The waterborne precursor material may be converted to an intermediate material or the final material using any one or more of curing or other chemical reactions, or separations such as removal of water (or other liquid solvent), monomer, or vapor. Curing refers to toughening or hardening of a polymeric material by crosslinking of polymer chains, assisted by electromagnetic waves, electron beams, heat, and/or chemical additives. Chemical removal may be accomplished by heating/flashing, vacuum extraction, solvent extraction, centrifugation, etc.

In some embodiments, the waterborne precursor composition is hardened with removal of liquid solvent, but without crosslinking of polymer chains. For example the components of the waterborne precursor composition may physically bind with the substrate (e.g., due to precipitation) and/or with each other, once liquid solvent is no longer dissolving the components.

Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final waterborne precursor composition may be from about 1 µm to about 1 cm or more, such as about 5 µm, 10 µm, 20 µm, 25 µm, 50 µm, 75 µm, 100 µm, 200 µm, 300 µm, 400 µm, 500 µm, 750 µm, 1 mm, 5 mm, 10 mm, or more.

EXAMPLES

Example 1: Waterborne Polyurethane Composition with Oil-Absorbing and Oil-Repelling Properties Materials: 4,4'-methylenebis(cyclohexyl isocyanate) (HMDI), triethylamine (TEA), 2,2-bis(hydroxymethyl)propionic acid (DMPA), 2-butanone (MEK), and dibutyltin dilaurate (DBTDL) are purchased from Sigma-Aldrich. 5147×PFPE-ethoxylated diol is obtained from Solvay Special Polymers.

A hydroxyl-endcapped fluoro-containing polyurethane dispersion is synthesized. 5147×PFPE-ethoxylated diol (9.38 g, 1.93 mol eq), MEK (8.462 g, 41 wt %), DMPA (0.54 g, 2.01 mol eq), and DBTDL (11.6 µL, 1000 ppm) are added to a 3-neck 500 mL glass reactor equipped with a Teflon mechanical stirrer and $N_2$ purge. The reactor is heating while HMDI (2.002 g, 3.82 mol eq) is added, mostly dropwise, to the reaction with stirring. The solvent is refluxing during the isocyanate addition.

After letting the reaction proceed for 3 hours, the reaction temperature reaches 92° C. and stirring is stopped. The temperature is lowered to a target of about 40° C. and stirring continues for another 20 min. An additional 4 mL of MEK is added to the prepolymer and is stirred until dissolution.

TEA (0.407 g, 2.01 mol eq) and DI water (25 g, 67 wt %) are added together in a separate container, vortexed for mixing, and then loaded into a disposable plastic syringe. A syringe pump dispenses the water/TEA mixture to the reactor at a rate of 0.66 mL/min with rapid stirring (about 500 rpm). Complete addition of the water/TEA mixture is done in about 30 min, and rapid stirring is continued for 1 hour.

The aqueous prepolymer solution is added to a plastic cup and the reaction flask is rinsed with DI water into the prepolymer. Finally, the solution is mixed using a centrifugal mixer for 1.5 min at 2300 rpm. From thermogravimetric analysis, the solution is about 11 wt % solids.

Example 2: Deposition of Multiphase Waterborne Coating

Daotan® TW 6431/45WA, a waterborne polybutadiene-based (PBD) dispersion, is received from Allnex (Frankfurt, Germany). Daotan TW 6431/45WA is a physically drying, solvent-free, surfactant-free, aqueous aliphatic polyurethane-urea-dispersion based on polybutadiene.

The fluoro-based waterborne dispersion in Example 1 (1.99 g) and Daotan TW 6431/45WA (0.51 g) are added to a cup and mixed using a centrifugal mixer for 30 seconds at 2300 rpm. The solution is further diluted with DI water and then sprayed onto glass slides using an airbrush and allowed to dry and harden at room temperature.

The multiphase coating described above and a control coating with just the Daotan TW 6431/45WA coating are each spotted with 10 µL of green-dyed squalene ($C_{30}H_{50}$), as a proxy for hydrocarbon oil, to demonstrate embodiments of the invention.

Figure 2A:
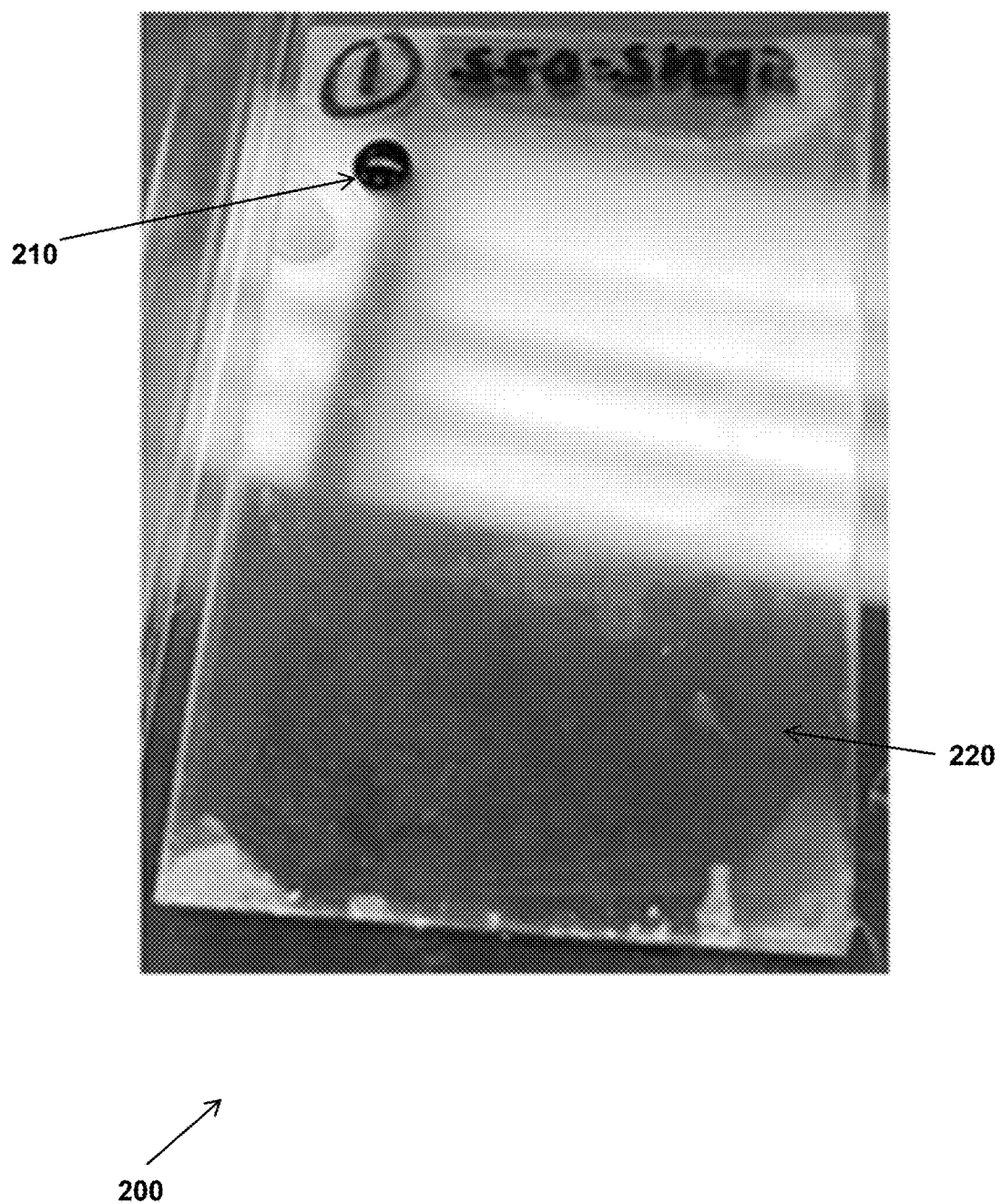
FIG. 2A is a photograph showing a multiphase coating with a copolymer of fluoropolymer and polybutadiene, in Example 2.
Figure 2B:
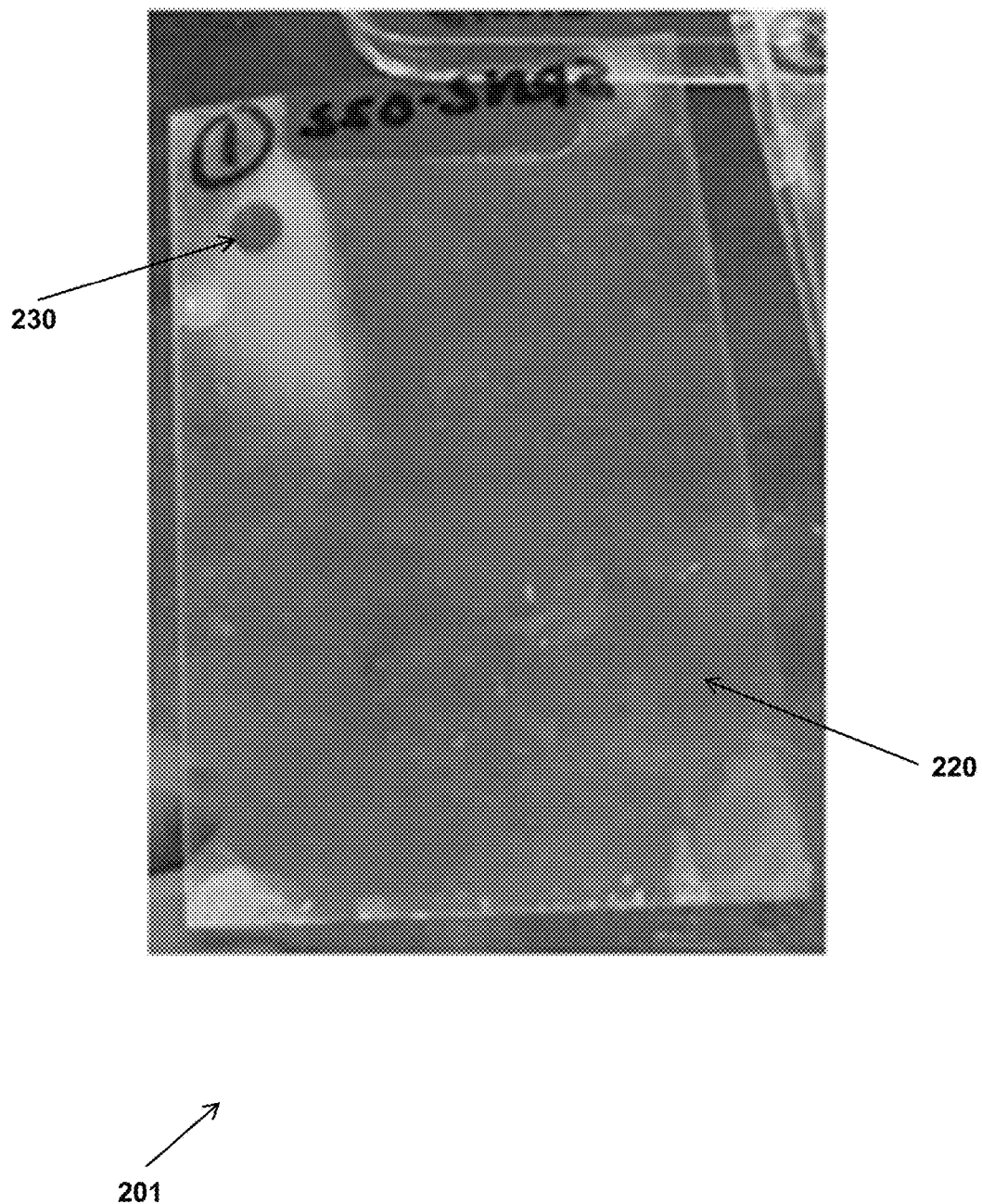
FIG. 2B is a photograph showing a multiphase coating with a copolymer of fluoropolymer and polybutadiene, following wiping of an oil spot, in Example 2.

FIG. 2A shows a multiphase coating 200 with a copolymer of fluoropolymer and polybutadiene. A drop of squalene 210 is initially placed on a glass slide 220. FIG. 2B shows the multiphase coating 201 the next day, following wiping of the original squalene spot 210 to leave a residual spot 230 on glass slide 220. The squalene does not disperse away from its original spot area, while within that area, some squalene is absorbed into the glass slide, according to FIG. 2B.

Figure 3A:
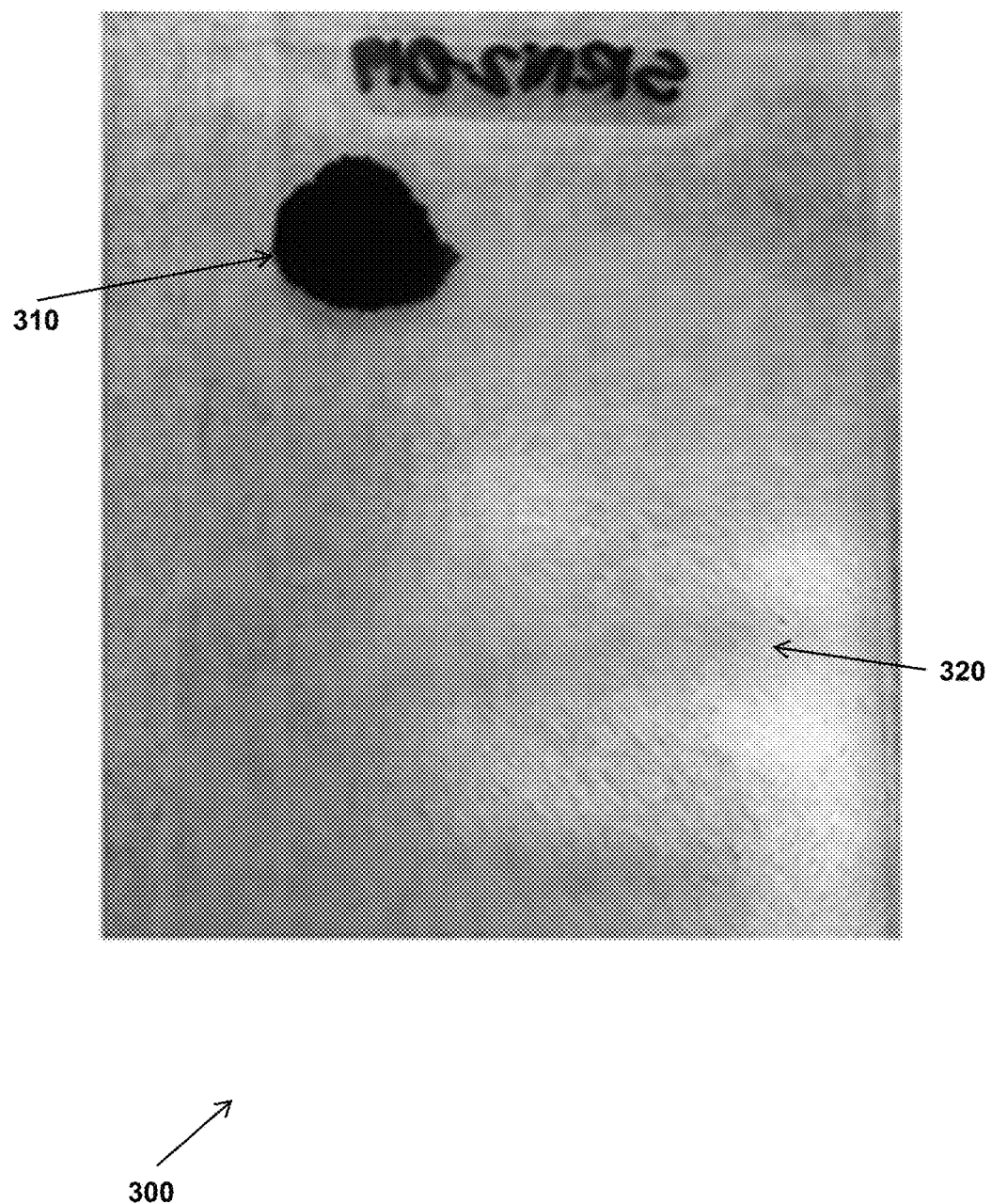
FIG. 3A is a photograph showing a control coating with a polybutadiene polymer and an initial oil spot, in Example 2.

FIG. 3A shows a control coating 300 (Daotan TW 6431/45WA) with a drop of squalene 310 initially placed on a glass slide 320. After a few minutes, according to FIG. 3B, the control coating 301 contains a dispersed squalene area 330 on the glass slide 320. Thirteen days later, according to FIG. 3C, the control coating 302 contains a significantly dispersed squalene area 350 on the glass slide 320.

Figure 3B:
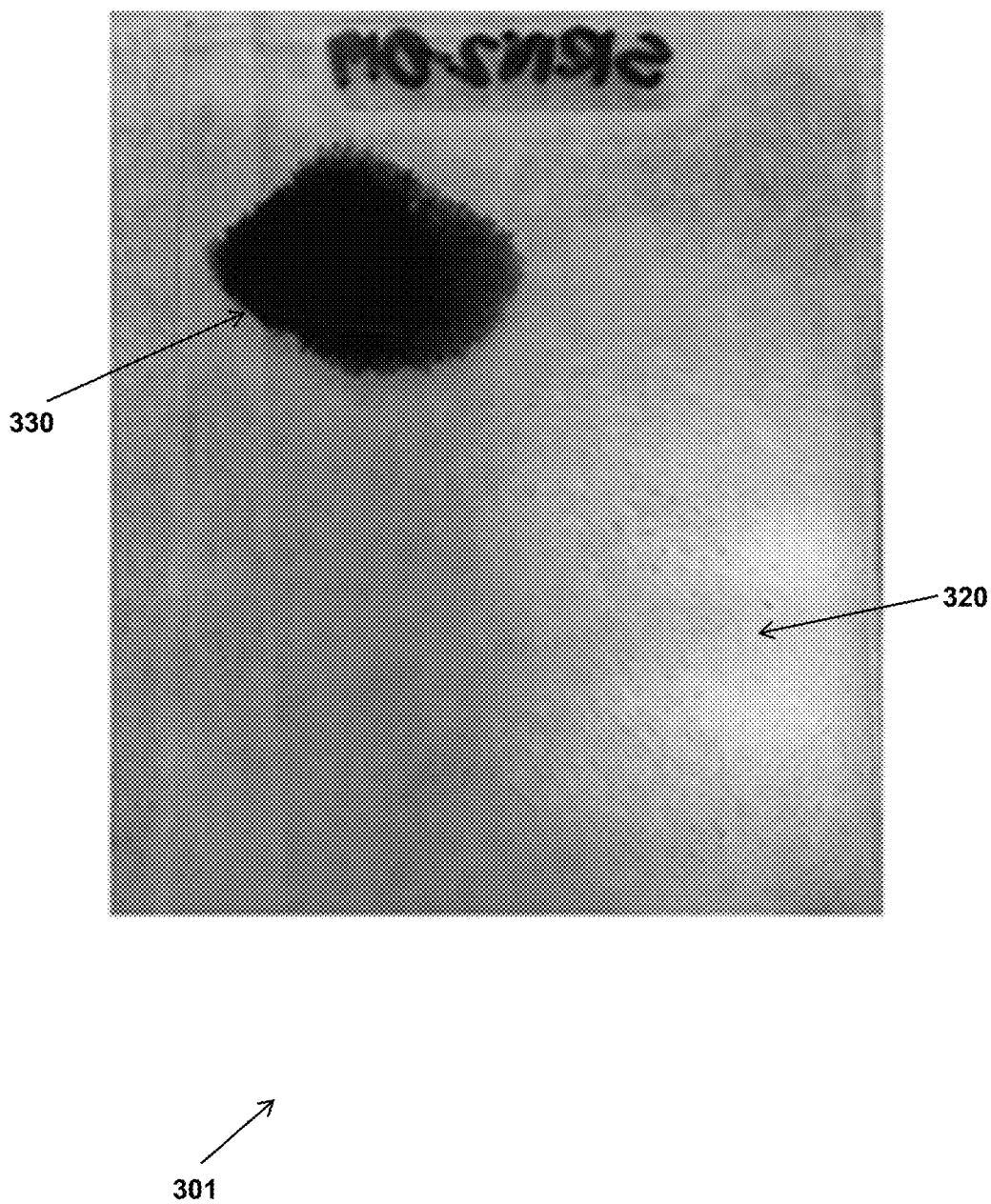
FIG. 3B is a photograph showing a control coating with a polybutadiene polymer and a dispersed oil spot, after a few minutes (compared to FIG. 3A), in Example 2.
Figure 3C:
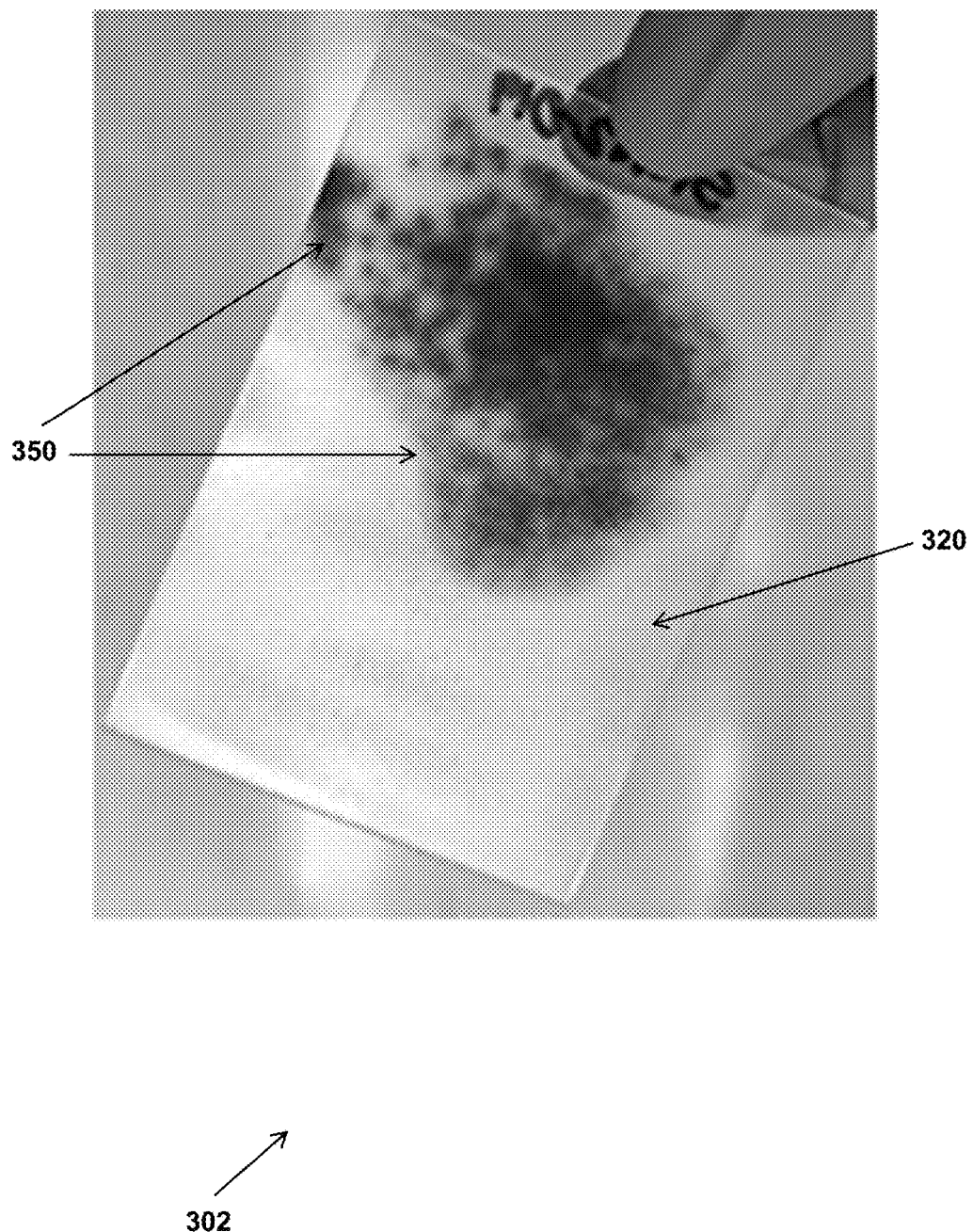
FIG. 3C is a photograph showing a control coating with a polybutadiene polymer and a significantly dispersed oil spot, after 13 days (compared to FIG. 3B), in Example 2.

FIGS. 3B and 3C depict the spreading of the oil that occurs almost instantly onto the PBD-only control (Daotan). By contrast, as shown in FIGS. 2A and 2B, the multiphase coating containing both fluoropolymer and PBD elements structured in the same coating, repels oil from the glass slide. After wiping the next day (FIG. 2B), it is evident that some of the oil is absorbed into the coating. This example demonstrates the multiproperty nature of the multiphase waterborne composition in some embodiments of this invention.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A multiphase waterborne composition comprising:
   (a) a first-material phase containing a first material; and
   (b) a second-material phase containing a second material that is chemically different than said first material,
   wherein said first material and/or said second material contains ionic species,
   wherein said first material is covalently bonded to said second material, and
   wherein said first-material phase and said second-material phase are microphase-separated on an average length scale of phase inhomogeneity from about 0.1 microns to about 100 microns.

2. The multiphase waterborne composition of claim 1, wherein said first-material phase is characterized by a first property, said second-material phase is characterized by a second property, and due to said first-material phase and said second-material phase being microphase-separated, said multiphase waterborne composition possesses a simultaneous combination of said first property and said second property, wherein said first property is selected from hydrophobic, hydrophilic, hygroscopic, oleophobic, and oleophilic, wherein said second property is selected from hydrophobic, hydrophilic, hygroscopic, oleophobic, and oleophilic, and wherein said first property is different than said second property.

3. The multiphase waterborne composition of claim 1, wherein at least one of said first material or said second material is selected from the group consisting of a hydrophobic material, a hydrophilic material, a hygroscopic material, an oleophobic material, and an oleophilic material.

4. The multiphase waterborne composition of claim 1, wherein one of said first material or said second material is a low-surface-energy polymer having a surface energy from about 5 mJ/m$^2$ to about 50 mJ/m$^2$.

5. The multiphase waterborne composition of claim 1, wherein said first material and said second material are independently selected from the group consisting of fluoropolymers, polyesters, polyethers, polyolefins, polyacrylates, polymethacrylates, epoxies, polysiloxanes, polycarbonates, cellulosic polymers, polyelectrolytes, and combinations thereof.

6. The multiphase waterborne composition of claim 1, wherein one of said first material or said second material forms discrete inclusions in a continuous matrix comprising the other of said first material or said second material.

7. The multiphase waterborne composition of claim 1, wherein said first material and said second material are present as distinct soft segments of a urethane/urea segmented block copolymer.

8. The multiphase waterborne composition of claim 1, wherein said ionic species is selected from the group consisting of an ionizable salt, an ionizable molecule, a zwitterionic component, a polyelectrolyte, an ionomer, and combinations, derivatives, or reaction products thereof.

9. The multiphase waterborne composition of claim 1, wherein said first material contains a first reactive species and said second material contains a second reactive species, and wherein said first reactive species and said second reactive species participate in covalent bonds between said first material and said second material.

10. The multiphase waterborne composition of claim 9, wherein said first reactive species is isocyanate, and wherein said second reactive species is a difunctional or multifunctional alcohol, a difunctional or multifunctional amine, or a combination thereof.

11. The multiphase waterborne composition of claim 9, wherein said first reactive species is epoxy, and wherein said second reactive species is a difunctional or multifunctional alcohol, a difunctional or multifunctional amine, a difunctional or multifunctional thiol, or a combination thereof.

12. The multiphase waterborne composition of claim 9, wherein some or all of said ionic species are said first reactive species and/or said second reactive species.

13. The multiphase waterborne composition of claim 1, said composition further comprising one or more additional components selected from the group consisting of a particulate filler, a pigment, a dye, a plasticizer, a surfactant, a flame retardant, a biocide, and combinations thereof.

14. The multiphase waterborne composition of claim 1, wherein said average length scale of phase inhomogeneity is from about 0.1 microns to about 10 microns.

15. The multiphase waterborne composition of claim 1, wherein said multiphase waterborne composition is disposed in a coating on a substrate selected from the group consisting of polymers, polymer composites, metals, ceramics, glass, paper, wood, leather, wool, and combinations thereof.

16. A waterborne precursor composition comprising:
(a) a liquid solvent comprising at least 50 wt % water;
(b) a first precursor material dissolved or suspended in said liquid solvent, wherein said first precursor material is a fluoropolymer; and
(c) a second precursor material dissolved or suspended in said liquid solvent, wherein said second precursor material is different than said first precursor material,
wherein said first precursor material and/or said second precursor material contains ionic species that provide aqueous dispersion stability to said waterborne precursor composition,
wherein said first precursor material is covalently bonded to said second precursor material, and
wherein said waterborne precursor composition is capable of hardening into a multiphase waterborne composition upon removal of said liquid solvent.

17. The waterborne precursor composition of claim 16, wherein said first precursor material and said second precursor material are at least partially phase-separated from each other within said waterborne precursor composition.

18. The waterborne precursor composition of claim 16, wherein said second precursor material is selected from the group consisting of a hydrophobic material, a hydrophilic material, a hygroscopic material, an oleophobic material, and an oleophilic material.

19. The waterborne precursor composition of claim 16, wherein said second precursor material is selected from the group consisting of polyesters, polyethers, polyolefins, polyacrylates, polymethacrylates, epoxies, polysiloxanes, polycarbonates, cellulosic polymers, polyelectrolytes, and combinations thereof.

20. The waterborne precursor composition of claim 16, wherein said ionic species is selected from the group consisting of an ionizable salt, an ionizable molecule, a zwitterionic component, a polyelectrolyte, an ionomer, and combinations, derivatives, or reaction products thereof.

21. The waterborne precursor composition of claim 16, wherein said first precursor material contains a first reactive species and said second precursor material contains a second reactive species, and wherein said first reactive species and said second reactive species participate in covalent bonds between said first precursor material and said second precursor material.

22. The waterborne precursor composition of claim 21, wherein one of said first reactive species or said second reactive species is isocyanate, and wherein the other of said first reactive species or said second reactive species is a difunctional or multifunctional alcohol, a difunctional or multifunctional amine, or a combination thereof.

23. The waterborne precursor composition of claim 21, wherein said first reactive species is epoxy, and wherein said second reactive species is a difunctional or multifunctional alcohol, a difunctional or multifunctional amine, a difunctional or multifunctional thiol, or a combination thereof.

24. The waterborne precursor composition of claim 21, wherein some or all of said ionic species are said first reactive species and/or said second reactive species.

25. The waterborne precursor composition of claim 16, wherein said waterborne precursor composition has a solids concentration from about 5 wt % to about 50 wt %, and a liquid solvent concentration from about 50 wt % to about 95 wt %.

* * * * *